I. R. CRECELIUS.
COUPLING DEVICE.
APPLICATION FILED FEB. 15, 1908.
915,160.
Patented Mar. 16, 1909.
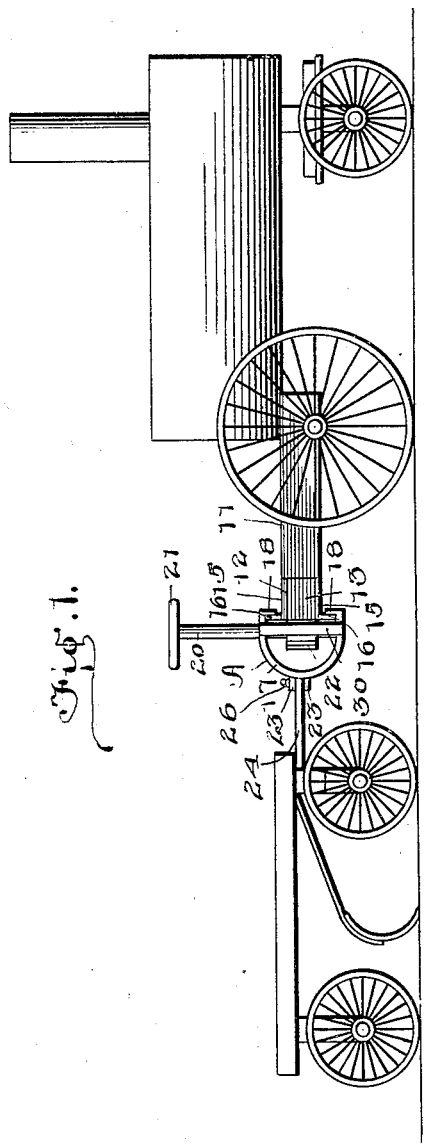
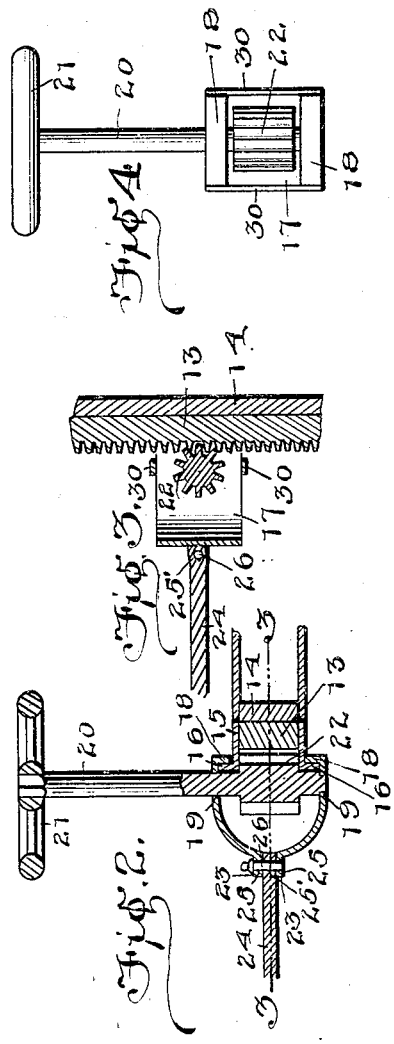
Inventor
Isaac R. Crecelius.
Witnesses
By Woodward & Chandler
Attorneys

UNITED STATES PATENT OFFICE.

ISAAC R. CRECELIUS, OF GIBSON COUNTY, INDIANA.

COUPLING DEVICE.

No. 915,160.

Specification of Letters Patent. Patented March 16, 1909.

Application filed February 15, 1908. Serial No. 416,132.

*To all whom it may concern:*

Be it known that I, ISAAC R. CRECELIUS, a citizen of the United States, residing in the county of Gibson and State of Indiana, have invented certain new and useful Improvements in Coupling Devices, of which the following is a specification.

This invention relates to coupling devices, and more particularly to couplings between power driven vehicles and other draft vehicles.

It has for its object to provide such a coupling which will facilitate short turns and which will direct the rearmost vehicle to any portion of the roadway.

Another object is to provide such an article of a simple structure, which may be manufactured largely from stock material.

Other objects and advantages will be apparent from the following description and it will be understood that changes in the specific structure shown and described may be made within the scope of the claims without departing from the spirit of the invention.

In the drawings forming a portion of this specification and in which like letters and numerals of reference indicate similar parts in the several views: Figure 1 is a side view of a traction engine equipped with this structure and drawing a road scraper, Fig. 2 is a detail sectional view of the shift gear, Fig. 3 is a sectional view on line 3—3 of Fig. 2, and Fig. 4 is a detail of the sliding coupling member.

Referring now to the drawings, there is shown a traction engine of the usual type having a platform 11 to which the shifting mechanism A is secured in a suitable manner. The shifting mechanism A comprises a rack bar 13 supported by portion 14 carried by the platform 11 and having secured upon its upper and lower faces L-beams 15 having oppositely projecting vertical flanges 16 to serve as guides for the sliding coupling member 17. The sliding coupling member 17 comprises a yoke stamped from heavy sheet metal and having the ends of its opposite arms inwardly directed to form flanges 18 engaged over the flanges 16. Registering openings 19 are formed in the upper and lower arms of the yoke, and a shaft 20 is revolubly engaged therein extending upwardly in the openings 19, and carrying at its upper end a hand wheel 21. A gear wheel 22 is secured to the shaft between the arms of the yoke 17 and is engaged with the rack bar 13 to move the coupling member laterally when rotated. Spaced ears 23 are stamped from the bight of the yoke and have engaged therebetween the forward end of a tongue 24 carried by the vehicle drawn. Perforations 25 are formed in the ears 23, and engaged downwardly therethrough and also through an eye 25' in the end of the tongue 24 there is a coupling pin 26, as shown.

It will be seen from the brief description that a shifting gear is provided which will be of exceedingly simple structure and that it will be effective in operation. The vehicle attached thereto may be guided over any part of the road, the extent of its operation being limited only by the length of the rack bar 13 and attached guides.

Tie rods 30 are secured to the outer ends of the yoke to hold the arms in spaced relation.

What is claimed is:

1. In a geared shiftable coupling, a yoke member adapted for slidable engagement with a rack member and carrying operative means for shifting the yoke longitudinally of the rack member, said yoke being stamped from sheet material, and having spaced arms, the outer ends of which are bent inwardly for engagement with a guide portion, said yoke having spaced rearwardly extending ears stamped therefrom and adapted for coupling engagement with a vehicle.

2. In a laterally shiftable coupling, the combination with a rack bar having oppositely extending flanges, of a yoke member stamped from sheet metal, said yoke member having spaced arms, the outer ends of which are bent inwardly and engaged over the flanges carried by the rack bar, said yoke having spaced rearwardly extending bars stamped therefrom, and adapted for coupling engagement with a vehicle, a gear revolubly carried between the spaced arms, and meshed with the rack bar, and means for rotating said gear to move the yoke longitudinally of the rack bar.

3. A geared shiftable coupling, comprising a yoke member stamped from sheet material and comprising opposite arms having their extremities turned inwardly, said yoke having spaced horizontal perforated ears stamped from its bight portion for coupling engagement with a vehicle to be drawn, a rack bar having opposite flanges engaged slidably inwardly of the inwardly turned portions of the yoke, the gear carried revolubly between the arms of the yoke in mesh with the rack bar, and means for rotating the gear to shift the coupling longitudinally of the rack bar.

4. In a shiftable coupling, a coupling member adapted to be engaged with a rack bar, and adapted to carry means for sliding the coupling longitudinally of the rack bar, said coupling comprising a yoke stamped from sheet material and having spaced arms the outer ends of which are bent inwardly to form engaging flanges, said yoke having also spaced perforated ears stamped from its bight portions and adapted for coupling engagement with a vehicle to be drawn.

In testimony whereof I affix my signature, in presence of two witnesses.

ISAAC R. CRECELIUS.

Witnesses:
JOHN E. COX,
EDWARD SKELTON.